United States Patent Office 3,173,698
Patented Mar. 16, 1965

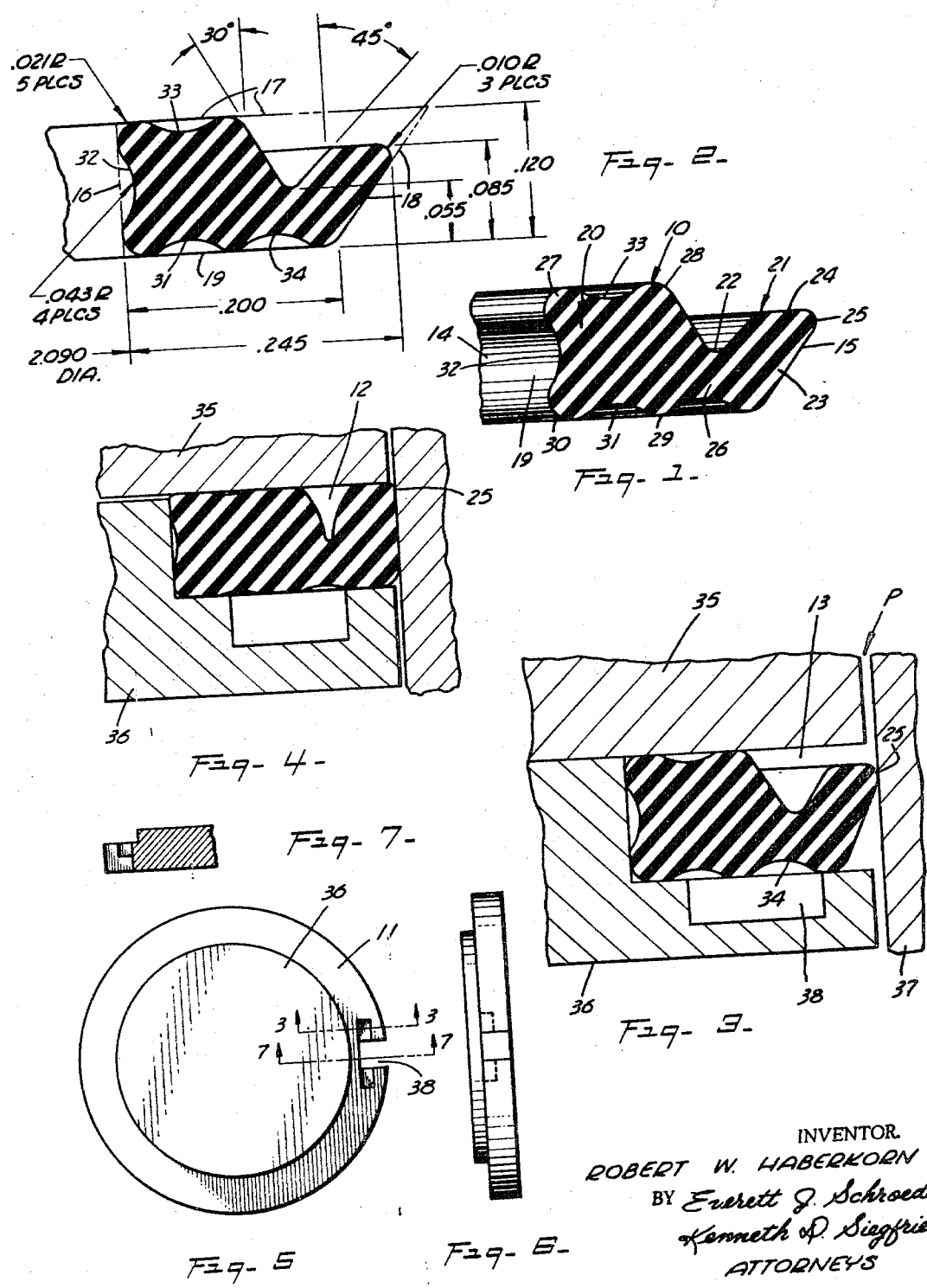

3,173,698
LIPPED SEALING RING
Robert W. Haberkorn, Minneapolis, Minn., assignor to Minnesota Rubber Company, Minneapolis, Minn., a corporation of Minnesota
Filed Dec. 4, 1961, Ser. No. 156,876
8 Claims. (Cl. 277—205)

This invention relates to sealing rings. More particularly, it relates to sealing rings of unusual cross-sectional configuration for perfecting seals between two or more members under unusual circumstances.

It has been found that under certain circumstances where seals are required between two or more members, the sealing area varies substantially as to its dimensions. In other words, under certain circumstances the tolerances permitted in the manufacture of such members between which a seal must be perfected are such that a conventional sealing member or ring is completely unsatisfactory. In addition, in many such situations wherein large dimension tolerances are permitted, one edge of the sealing groove is relatively sharp and consequently frequently causes damage to a conventional sealing ring during the installation thereof when a sealing ring of sufficient dimensions is selected to provide the required snug fit. My invention is directed toward providing a sealing ring uniquely constructed to accomplish an effective seal despite its use in situations permitting such large tolerances. My invention is also directed toward overcoming the unfavorable circumstances whereunder serious damage is done to the sealing ring under such conditions during installation.

It is a general object of my invention to provide a novel and improved sealing ring of simple and inexpensive construction, installation, and operation.

A more specific object is to provide a novel and improved sealing ring of unique cross-sectional configuration which peculiarly adapts the same for use in perfecting a seal in grooves of large dimensional tolerances.

Another object is to provide a novel and improved sealing ring of simple and inexpensive construction which has a unique cross-section permitting the same to be easily and readily installed without damage thereto.

Another object is to provide a novel and improved sealing ring of unique cross-sectional configuration which gives it a high degree of variability and adaptability for usage under various circumstances.

Another object is to provide a novel and improved sealing ring which will function substantially equally well whether under a high or low degree of compression.

Another object is to provide a novel and improved sealing ring which, because of its unique cross-sectional configuration, will not wear unduly when used in grooves having relatively large dimensional tolerances.

These and other objects and advantages of this invention will more fully appear from the following description, made in connection with the accompanying drawings, wherein like reference characters refer to the same or similar parts throughout the several views, and in which:

FIG. 1 is a cross-sectional view of one embodiment of my invention with portions thereof shown in perspective.

FIG. 2 is a cross-sectional view of my sealing ring with the various dimensions and curvatures indicated.

FIG. 3 is a vertical sectional view of one of my sealing rings installed within a particular type of groove wherein the tolerances in dimensions are large and the groove is relatively large.

FIG. 4 is a vertical sectional view of a similar type groove with one of my sealing rings installed therein wherein the tolerances in dimensions are large but the groove is substantially smaller than that shown in FIG. 3.

FIG. 5 is a plan view of the sealing groove.

FIG. 6 is a side elevational view of the groove structure, and

FIG. 7 is a fragmentary sectional view taken along line 7—7 of FIG. 5.

The embodiment of my invention shown in FIGS. 1–4 is comprised of an elongated seal in ring form indicated generally by the numeral 10 and adapted to be received within a groove 11 which has large dimensional tolerances such that the groove may be of the size shown as groove 12 in FIG. 4 or as groove 13 in FIG. 3. In order to provide an adequate seal for sealing grooves 11 having such wide dimensional tolerances, I have devised a seal of unique cross-sectional configuration best shown in FIGS. 1 and 2 which provides a highly satisfactory seal when utilized in grooves of either of the types indicated by the numerals 12 and 13. FIGS. 3 and 4 indicate the shape taken by my sealing ring under these different circumstances. It should be noted that the entire sealing ring is of uniform cross-section throughout its length and is preferably formed of a resilient flowable material such as rubber throughout.

My ring, as shown, has inner circumferential surfaces indicated by the numeral 14 and outer circumferential surfaces indicated by the numeral 15. Reference to FIGS. 1 and 2 show that my sealing ring in its free form is of generally right angled trapezoidal shape. The generally right trapezoidal shape is best illustrated in FIG. 2 wherein the trapezoidal shape is bounded by the broken line 16, the combined solid and broken line 17, the combined solid and broken line 18, and the solid line 19. It will be noted that the longer side 17 is parallel to the shorter side 19. The non-parallel side 16 is actually the inner circumferential surface 14 and the non-parallel side 18 constitutes the outer circumferential surface 15.

Reference to FIGS. 1 and 2 show that the generally trapezoidal shape in cross-section of my ring includes a generally rectangular major portion 20 which in the instance shown is square and a minor portion 21 which constitutes a cantilever projection from the major portion 20. A valley 22 formed in the longer parallel surface provides or forms this cantilever projection which terminates in a lip 23. The lip 23 has a flat end 24 and a convexly shaped sealing edge 25. The presence of the valley 22 creates an area of reduced thickness identified by the numeral 26 to provide the cantilever action of the sealing lip 23. This reduced area 26 constitutes a flexible support mounting for the lip 23 in cooperation with the area which connects that reduced area to the major portion 20.

The major portion 20 has a convex lobe at each of its corners, these lobes having been identified by the numerals 27, 28, 29, and 30. As best shown in FIG. 2, these lobes preferably have a radius of .021 inch. The major portion 20 also has concave surfaces at three of its sides disposed between these lobes, these surfaces having been identified by the numerals 31, 32, and 33. A fourth concave surface 34 is identical to the surfaces 31–33 inclusive, each having a radius of approximately .043 inch as best shown in FIG. 2.

FIGS. 3 and 4 show a pair of abutting members 35 and 36 generally of a split piston defining the groove 13 in cooperation with the wall 37 of a sleeve or cylinder. As shown the groove 13 is generally rectangular in cross-sectional configuration. However, in certain installations such a groove has a void in the form of a T-shaped opening 38 formed in the bottom thereof and the problem to be overcome is to produce a sealing ring of a cross-sectional configuration such that it will not flow into the void and yet will accomplish an adequate seal at the desired point against the cylinder wall. The pressure is applied in the direction of the arrow indicated by the letter P. FIG. 3 illustrates the groove with maximum space for the sealing ring whereas FIG. 4 represents the groove with minimum space. The lip 23 perfects the seal at its convex surface 25 regardless of whether the ring is subjected to a minimum of compression, as shown in FIG. 3 or a maximum of compression, as shown in FIG. 4. It will be noted that the lobe to the right of the concavity identified by the numeral 34 extends beyond the T-shaped opening 38 so as to seal off the same.

In use, the sealing ring is installed by slipping the same into the groove 11 from above as viewed in FIG. 3. In the event maximum space is available, there is no problem in installation but in the event minimum space, as shown in FIG. 4 is available, then the cantilever projection yields radially inwardly as shown in that figure. The flexible support mounting for the sealing lip 23 is important in such instances in that it prevents serious damage to the sealing ring during installation of the same.

It will be noted that the unique cross-sectional configuration of my sealing ring as disclosed and claimed herein permits its usage in sealing grooves of unusually large dimensional tolerances. It is of simple and inexpensive construction and can be easily and readily installed without damage thereto. More important, however, is the fact that its unique cross-sectional configuration gives it a high degree of variability and adaptability for usage under circumstances wherein there are wide dimensional tolerances and yet will function equally well whether under high or low degrees of compression. Moreover, because of the flexible support mounting provided by the cantilever projection, there will be no undue wear when a ring of this construction is utilized whether the groove has relatively large dimensional tolerances or not. Consequently, a ring of this configuration has many more applications within which it will function in a highly satisfactory manner and consequently it is highly desirable for use in situations where the dimensional tolerances are not close.

It will, of course, be understood that various changes may be made in the form, details, arrangement and proportions of the parts without departing from the scope of this invention which consists of the matter shown and described herein and set forth in the appended claims.

What is claimed is:

1. A sealing device comprising,
   (a) a continuously formed ring-like member made of a resilient flowable material such as rubber throughout and adapted to be fitted into a sealing groove of ring-like configuration,
   (b) said ring-like member in its free form being of uniform cross-section throughout and having inner and outer circumferential surfaces,
   (c) and in its free form having in cross-section a generally square shaped major portion and a minor portion constituting a lip extending laterally from one side of said major portion and in a direction away from one of said circumferential surfaces toward the other of said circumferential surfaces,
   (d) said major portion having convexly shaped lobes at each of its corners and concavely shaped surfaces at each of its sides between said lobes except for said side at which said minor portion is connected to said major portion,
   (e) said minor portion having a convexly shaped lobe at said circumferential surface toward which it extends and a concave surface between its said lobe and the lobe at the adjacent corner of said major portion,
   (f) said lip terminating short of the opposite side of said major portion toward which it extends at a point axially removed from said major portion,
   (g) said lip being connected to said major portion by a restricted area having transverse dimensions less than the transverse thickness of said lip and constituting a flexible support mounting for said lip.

2. The structure defined in claim 1 wherein said minor portion constitutes a cantilever projection from said major portion.

3. A sealing device comprising,
   (a) a continuously and uniformly formed ring-like member made of a resilient flowable material such as rubber throughout and adapted to be fitted into a sealing groove of ring-like configuration,
   (b) said ring-like member in its free form having inner and outer circumferential surfaces and being of generally right angled trapezoidal shape in cross-section,
   (c) one of the non-parallel sides of said member constituting one of said surfaces and the other of said non-parallel sides constituting the other of said surfaces,
   (d) said member in cross-section having a pair of axially spaced lobes at one of its sides connected by a concave surface and having a second pair of axially spaced lobes at its other side disposed opposite said first mentioned pair and also connected by a concave surface,
   (e) said member also having in cross-section at its said other side a third lobe spaced axially from said second pair of lobes and connected thereto by a concave surface,
   (f) said ring-like member in cross-section having a lip element extending axially outwardly and radially from said last mentioned lobe toward said side having only a pair of lobes,
   (g) said lip element terminating short of said side having only a pair of lobes and being supported upon the remainder of said member by a restricted portion disposed between said last mentioned lobe and its associated pair of lobes,
   (h) said restricted portion having transverse dimensions less than the transverse thickness of said lip element.

4. A sealing device comprising,
   (a) a continuously formed ring-like member made of a resilient flowable material such as rubber throughout and of uniform cross-section and adapted to be fitted into a sealing groove of ring-like configuration,
   (b) said ring-like member in its free form having inner and outer circumferential surfaces and being generally of right angled trapezoidal shape in cross-section,
   (c) one of the parallel sides of said member extending axially thereof and having a pair of spaced convexly shaped lobes thereat and the other of said parallel sides having a plurality of spaced lobes thereat numbering in excess of two,
   (d) said member having in cross-section a sealing lip element at its side opposite the side between its right angles,
   (e) said element extending radially from one of said circumferential surfaces toward the other of said circumferential surfaces and axially outwardly,
   (f) said sealing lip element being supported upon said member by a restricted portion having transverse dimensions less than the transverse thickness of said lip element.

5. In a sealing device,
   (a) a pair of opposed contiguous members,
   (b) one of said members having a sealing groove of generally rectangular cross-sectional shape formed therein with a bottom and a side wall defining two sides of said groove and the other member defining the top of said groove,
   (c) a third member extending along said two members opposite said side wall and constituting the remaining side of said groove,
   (d) and an elongated seal element disposed in snug-fitting relation within said groove and made of a resilient flowable material such as rubber throughout,
   (e) said seal element in its free form having in cross-section, a generally rectangularly shaped major portion and a minor portion constituting a cantilever projection extending from one side of said major portion toward its opposite side and laterally toward said third member and bearing thereagainst, (f) the opposite sides of said seal element each bearing against one of said members, (g) said major portion in its free form cross-section having convexly shaped lobes at each of its corners and concavely shaped surfaces at each of its sides between said lobes except at its side from which said minor portion extends, (h) said minor portion having a convexly shaped lobe adjacent the side of said major portion from which it extends, (i) and having a concave surface between its said lobe and the lobe at the adjacent corner of said major portion, (j) said cantilever projection having a support mounting on said major portion of restricted dimensions relative to the remainder of said projection.

6. The structure defined in claim 5 wherein, (k) said cantilever projection extends away from the bottom of said groove toward the opposite side thereof and terminates short thereof and is substantially thicker than its said support mounting.

7. The structure defined in claim 5 wherein, (k) said cantilever projection extends away from the bottom of said groove and against the side of said groove opposite said bottom.

8. The structure defined in claim 5 wherein, (k) fluid pressure is applied against said seal in a direction opposite to that in which said projection extends.

References Cited by the Examiner

UNITED STATES PATENTS

| 2,920,882 | 1/60 | Allinquant | 277—166 X |
| 2,983,533 | 5/61 | Tisch | 277—209 |
| 3,031,200 | 4/62 | Hamer | 277—177 |

FOREIGN PATENTS 544,981   5/42   Great Britain.

LEWIS J. LENNY, *Primary Examiner.*

SAMUEL ROTHBERG, EDWARD V. BENHAM, *Examiners.*